May 31, 1932.  W. M. WHITLOCK  1,861,169
CAMERA ATTACHMENT FOR TITLING PICTURES
Filed May 21, 1931  2 Sheets-Sheet 1
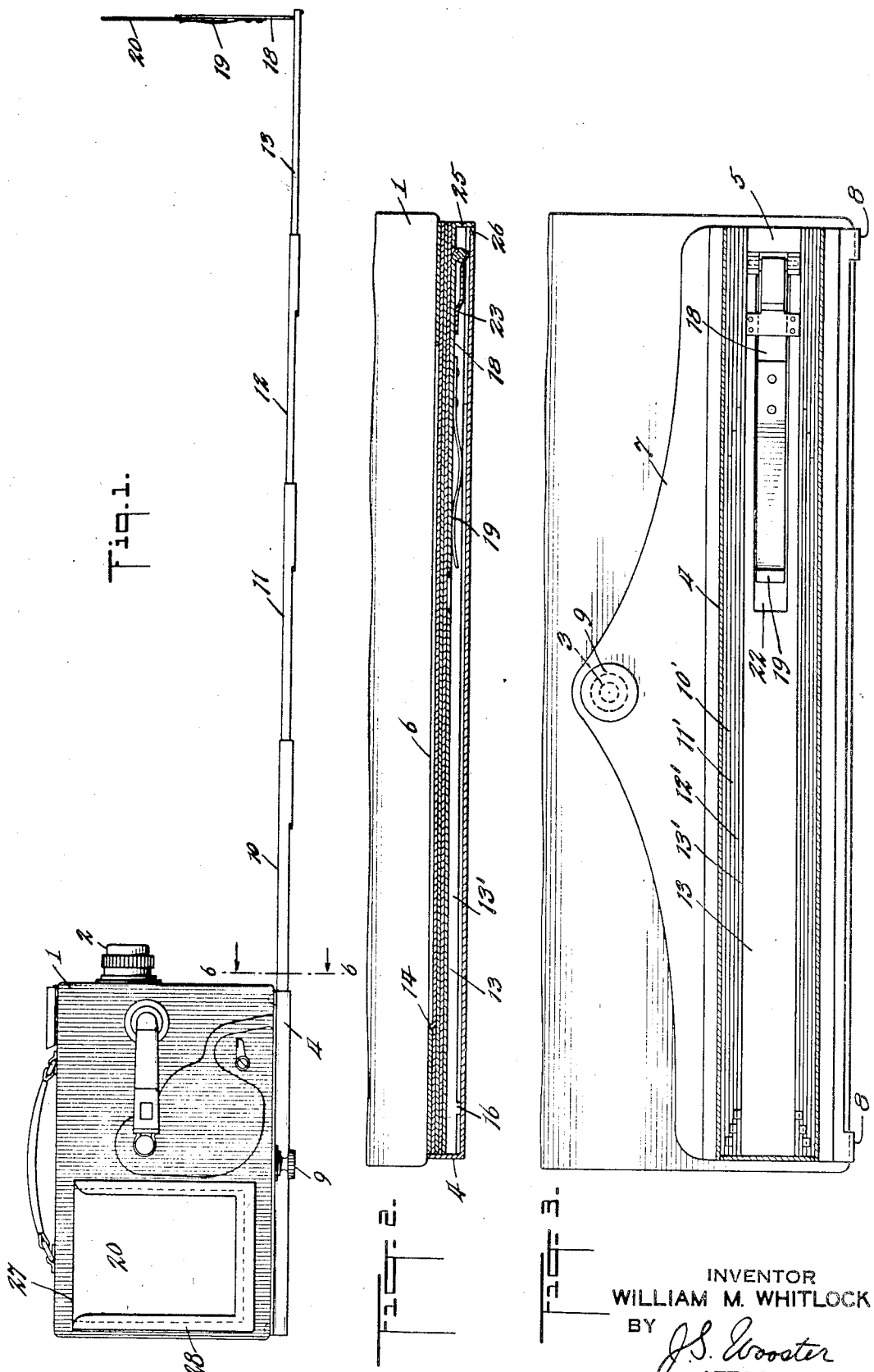
INVENTOR
WILLIAM M. WHITLOCK
BY
J. S. Wooster
ATTORNEY May 31, 1932. W. M. WHITLOCK 1,861,169
CAMERA ATTACHMENT FOR TITLING PICTURES
Filed May 21, 1931  2 Sheets-Sheet 2
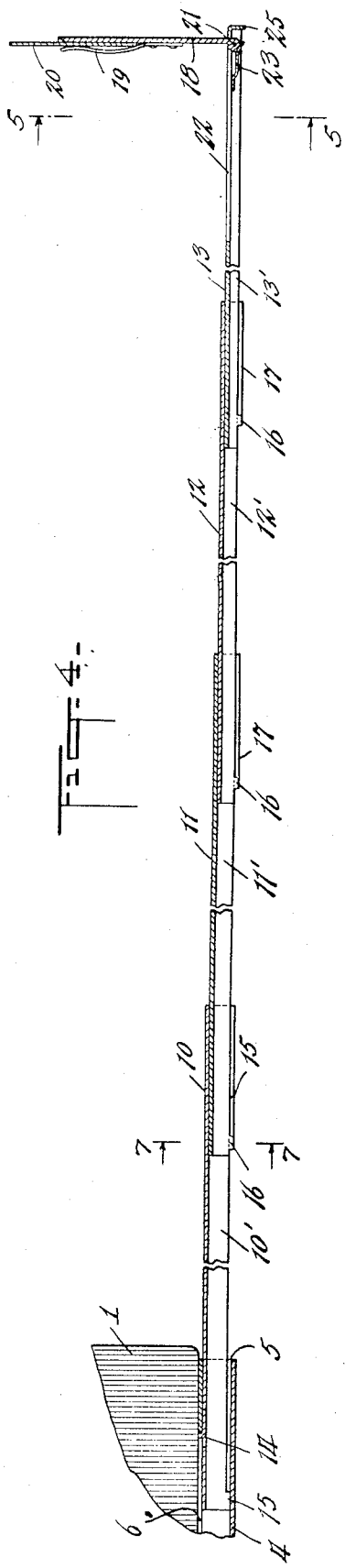
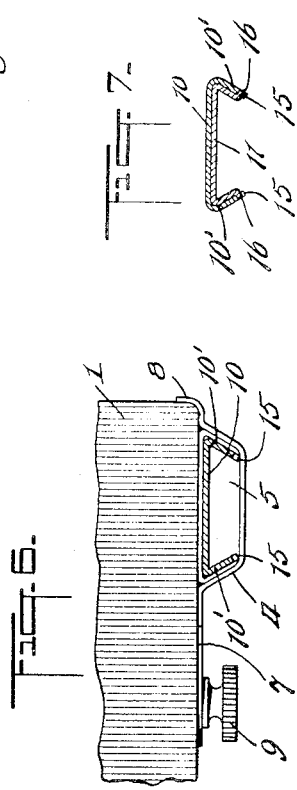
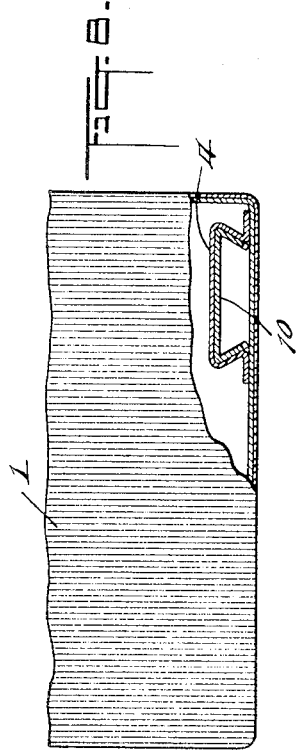
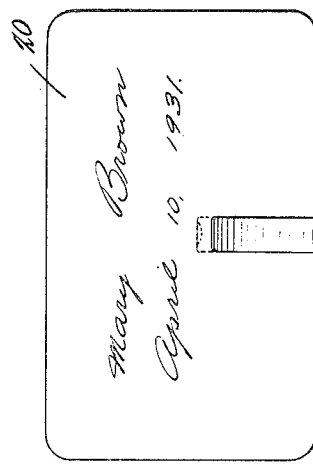
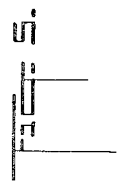
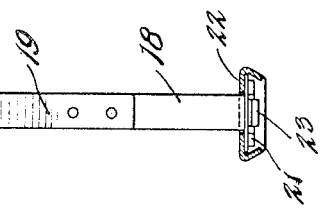
INVENTOR
WILLIAM M. WHITLOCK
BY
J. S. Wooster
ATTORNEY Patented May 31, 1932

1,861,169

UNITED STATES PATENT OFFICE

WILLIAM M. WHITLOCK, OF SCARSDALE, NEW YORK

CAMERA ATTACHMENT FOR TITLING PICTURES

Application filed May 21, 1931. Serial No. 538,914.

This invention relates to a picture titling device for motion picture and other cameras, and has for its object to provide a simple and inexpensive attachment for photographing titles, designs or other matter on photographic plates or films.

Another object of the invention is to provide a compact, inconspicuous device of this type which may be built into or attached to any suitable camera in such a way that it is concealed when not in use but is readily accessible for instantaneous use when desired.

My invention is intended primarily for amateur and other motion picture cameras where the usual custom has been to cut the exposed film apart, make the necessary titles, and then paste the film and titles together in the proper sequence. I avoid some or all of these extra operations by photographing the titles directly on the film either before or after the pictures are taken.

In the preferred form of the invention my device is enclosed in a small housing which may be built into a camera, but in the case of amateur roll-film motion picture cameras is preferably attached to the bottom of the camera by means of a single screw secured to the usual threaded tripod bushing. The device has an extensible arm comprising a plurality of telescoping links or sections which may be collapsed inside the housing or drawn out in front of the camera. The last link of the series is provided with a clip which is arranged to hold a card in the field of the camera lens. This clip is preferably hinged to the extensible arm and is adapted to be folded over on the arm so as to fit into the housing when the arm is collapsed.

The links of the extensible arm are preferably constructed in the form of flat trucks of dovetail cross-section, sliding one on the other, giving the arm great strength when extended and minimum bulk when collapsed. The housing is likewise flat and of the same general cross-section as the extensible arm, and the entire device is so compact that when the several links are nested inside the housing the device is scarcely noticeable and adds little if any weight to the camera.

I also provide a special frame which I attach to one flat side of the camera to hold a supply of cards on which the titles are to be inscribed. The opposite side of the camera is likewise flat and may be held in the operator's hand or rested on any available object, so that the camera itself serves as a convenient rest or writing tablet. The cards may be instantly removed from the frame and inserted in the clip at the end of the extensible arm and thus photographed on the camera film.

These and other features and advantages of the invention will be described in connection with the accompanying drawings, in which:

Fig. 1 is a side view showing one embodiment of the invention attached to a motion picture camera, with the telescoping arm extended and the holder supporting a card in position for photographing a title;

Fig. 2 is a longitudinal section through the device with the telescoping links and card holder nested inside the housing;

Fig. 3 is a transverse section through the bottom of the housing, showing the position of the parts when collapsed, and showing one method of attaching the device to the bottom of the camera;

Fig. 4 is a longitudinal section through the device with the parts extended as in Fig. 1;

Fig. 5 is a transverse section on the line 5—5 of Fig. 4, showing the construction and mounting of the card holder;

Fig. 6 is a transverse section on the line 6—6 of Fig. 1, showing the preferred method of attaching the device to the camera;

Fig. 7 is a transverse section on the line 7—7 of Fig. 4, showing the stops which limit the relative movement of the links of the extensible arm; and Fig. 8 is a partial section showing a modification of the invention in which the device is mounted inside the base of a camera.

In the drawings, the numeral 1 represents an ordinary motion picture camera having substantially flat sides and bottom and the usual lens 2 adjacent the left-hand side of the camera. Cameras of this type usually have a threaded bushing 3 at or near the center of the bottom wall for the attachment of a tripod, although amateur photographers seldom have occasion to use a tripod.

In the form shown in the drawings, the picture-titling device consists of a narrow elongated housing 4 of dovetail cross-section having an opening 5 in the forward end, and a central longitudinal slot 6 in the roof. The housing may be made of stamped metal and is provided on one side with an integral extension 7 adapted to lie flat against the bottom of the camera, and on the other or outer side with angular tabs or fingers 8 adapted to engage the bottom edge of the camera as shown in Figs. 3 and 6. The device is secured to the bottom of the camera by means of a screw 9 which engages the threaded bushing 3, and in securing the device in place the metal is stretched sufficiently to cause the fingers 8 to grip the bottom edge of the camera.

The housing 4 contains an extensible arm consisting of a series of telescoping links or sections 10, 11, 12 and 13, of any suitable shape and of progressively decreasing size. These links are adapted to slide one inside the other and to be completely concealed inside the housing 4, as shown in Figs. 2 and 3, or drawn out lengthwise like a telescope as shown in Figs. 1 and 4. In the preferred form shown in the drawings the several links of the extensible arm consist of flat metal strips having their edges 10, 11, etc., bent to the same dovetail shape as the housing 4 so that each link fits snugly inside the next preceding larger link and can slide longitudinally therein, but is locked against movement in a transverse direction.

The innermost or largest link 10 of the extensible arm, of course, slides in the trackway formed by the housing 4, and the upper flat face of this link is provided with an upstanding lip 14 which slides in the slot 6 in the roof of the housing 4. When the link 10 is drawn out of the housing to the position shown in Fig. 4, the lip 14 strikes against the forward edge of the slot 6 and prevents further outward movement. The lower edges 10' of the innermost section 10 are cut away slightly intermediate their ends so as to provide depending lips 15 at their inner and outer ends. The next succeeding link 11 likewise has the lower edges of its side walls 11' cut away intermediate the ends to form depending end lips 16 and 17. The lips 16 are bent outwardly so that they will strike against the edges of the lips 15 on link 10 when the link 11 is drawn out through the link 10, thus preventing the link 11 from being drawn completely through the link 10. Each succeeding small link is contructed in the same manner as the link 11, and in each case the lips 16 at the left-hand side, as viewed in Figs. 1 and 4, are bent outwardly as shown in Fig. 7 so that they will strike against the lips 17 adjacent the forward ends of the surrounding larger links so as to limit the outward movement of the parts.

The outermost link 13 is provided with a card holder preferably consisting of a rigid metal strip 18 having a spring clip 19 secured thereto, as shown in Figs. 1 and 4, so as to receive and hold a card 20 having the title of the picture written or printed thereon as shown in Fig. 5. The strip 18 is hinged at 21 between the side flanges 13' of the link 13, and this link has a central longitudinal recess or slot 22 into which the card holder may be folded as shown in Figs. 2 and 3. The position of the card holder is controlled by a spring 23 which is secured to the flanges 13' and is adapted to maintain the card holder in either the upright or folded position as desired. A nick 24 is formed in the upper edge of the strip 18 so that the card holder may easily be raised by insertion of the finger-nail. The outer edge of the link 13 is turned down at 25 to provide a finger piece by which this outermost link may be moved, and a groove 26 is formed in the bottom of the housing 4 at the end occupied by the flange 25 when in the nested position shown in Figs. 2 and 3, permitting insertion of the finger-nail to withdraw the link 13 from the housing.

In Figs. 2 and 3 the several links of the extensible arm are shown in the nested position, entirely concealed inside the housing 4. When it is desired to take a picture of a title, either before or after the picture exposure on the same film, it is simply necessary to grasp the depending edge 25 of the link 13 with the finger or finger-nail, and draw it out of the housing 4. The link 13 emerges from the housing until the outwardly-bent lips 16, depending from the flanges 13', strike against the edges of the lips 17 on the link 12, whereupon the link 12 emerges from the housing until the lips 16 on the flanges 12' strike against the edges of the lips 17 on link 11. The link 11 thereupon emerges from the housing, and in this manner the entire arm emerges in a continuous train until the innermost link 10 is drawn out to a point where the upturned lip 14 strikes against the edge of the slot 6 in the roof of the housing 4 as shown in Fig. 4. The length of the arm when extended may vary as desired, but for an amateur motion picture machine of the type here shown I have found a length of 12 to 14 inches to be satisfactory.

Although I do not limit myself to the dovetail shape of the telescoping links shown in the drawings, I have found this form preferable to tubular or other shapes for several reasons. One important advantage of this construction is that it provides great strength without excessive bulk since the several links of the telescope may be of much greater width than height so that the presence of the device on the bottom of the camera is scarcely noticeable and is not such as to inconvenience or annoy the operator. The dovetail construction of the several links of the telescope likewise provides a continuous smooth track which is easily drawn out or collapsed but is not easily jammed. The bottom of the track is open and may therefore easily be cleaned if obstructed for any reason.

By the term "dovetail" as used in the specification and claims I intend to indicate a channel or U-shaped member in which the legs of the channel or U are bent inwardly towards each other so as to prevent disengagement between the parts of the track.

Cameras of the type referred to herein are often carried by travelers in the country or in inaccessible places where it is desirable to reduce the amount of material in the camera kit to a minimum. In order to keep a supply of title cards accessible for immediate use, and to facilitate writing in inconvenient or inaccessible localities, I provide a card holder 27, having overlying side and bottom flanges 28 adapted to hold a supply of cards 20 on which the titles are to be inscribed. This card holder is attached in any suitable manner to one flat side of the camera, and since the opposite side of the camera is likewise flat, it may be held in the operator's hand or rested on any available object, so that the camera itself serves as a convenient rest or writing tablet; which is an important advantage especially in inaccessible localities.

It will be understood that various changes may be made in the details of construction herein shown and described without departing from the scope and spirit of the invention as defined in the appended claims.

The invention claimed is:

1. A picture titling device for cameras, comprising a housing adapted to be attached to a camera, an extensible arm having a plurality of telescoping links adapted to be collapsed inside said housing or drawn out in front of the camera, a recess in one of said links, and a card holder hinged to the recessed link and adapted in one position to lie parallel to the plane of the camera lens, and in another position to lie in said recess so as to fit into said housing when the arm is collapsed.

2. A picture titling device for cameras, comprising a housing adapted to be attached to a camera, an extensible arm adapted to be collapsed inside said housing or drawn out in front of the camera, means on said arm for holding a card in position to be photographed when the arm is extended, angular fingers on one side of said housing adapted to engage the edge of the camera, an extension on the other side of said housing, and means for securing said extension to the camera.

3. A picture titling device for cameras, comprising a housing adapted to be attached to the bottom of a camera, an extensible arm adapted to be collapsed inside said housing or drawn out in front of the camera, means on said arm for holding a card in position to be photographed when the arm is extended, flexible angular fingers on one side of said housing adapted to engage a bottom edge of the camera, an extension on the other side of said housing, and means for securing said extension to the bottom of the camera while holding said flexible fingers under tension so that they grip the said bottom edge of the camera.

4. A picture titling device for cameras of the type having a threaded tripod bushing in the bottom, comprising a flat narrow housing adapted to be attached to the bottom of the camera, an extensible arm adapted to be collapsed inside said housing or drawn out in front of the camera, means on said arm for holding a card in position to be photographed when the arm is extended, an extension on one side of said housing, a screw for attaching said extension to said tripod bushing, and flexible angular fingers on the other side of said housing adapted to grip the bottom edge of the camera.

5. A picture titling device for cameras, comprising a housing adapted to be attached to the camera, an extensible arm having a series of flat telescoping links of dovetail cross-section adapted to be collapsed inside said housing or drawn out in front of the camera, means on said links for limiting their outward movement with respect to one another, and means on the last link of the telescoping series for holding a card in position to be photographed when the arm is extended.

6. A picture titling device for cameras, comprising a housing adapted to be attached to the camera, an extensible arm having a series of flat telescoping links of dovetail cross-section adapted to be collapsed inside said housing or drawn out in front of the camera, projecting lips on said links adapted to engage similar lips on cooperating links to limit the extensibility of said arm, and means on the last link of the telescoping series for holding a card in position to be photographed when the arm is extended.

7. A picture titling device for cameras, comprising a housing adapted to be attached to the camera, an extensible arm having a series of flat telescoping links of dovetail cross-section adapted to be collapsed inside said housing or drawn out in front of the camera, means on said links for limiting their outward movement with respect to one another, and a card holder hinged to the last link of the telescoping series and adapted in one position to lie parallel to the plane of the camera lens, and in another position to lie parallel to said last link so as to fit into the housing when the arm is collapsed.

8. A picture titling device for cameras, comprising a housing adapted to be attached to the camera, an extensible arm having a series of flat telescoping links of dovetail cross-section adapted to be collapsed inside said housing or drawn out in front of the camera, a longitudinal recess in the last link of the telescoping series, and a card holder including a spring clip hinged to the recessed link and adapted in one position to lie parallel to the plane of the camera lens, and in another position to lie in said recess so as to fit into said housing when the arm is collapsed.

Signed at New York, in the county of New York and State of New York this 20th day of May A. D. 1931.

WILLIAM M. WHITLOCK.